(12) United States Patent
Canis et al.

(10) Patent No.: US 9,412,107 B2
(45) Date of Patent: Aug. 9, 2016

(54) PREDICTIVE FRAUD SCREENING

(71) Applicant: Amadeus S.A.S., Sophia Antipolis (FR)

(72) Inventors: Laure Canis, Nice (FR); Cedric Florimond, Vallauris (FR); Thibaud Andrevon, Vallauris (FR)

(73) Assignee: AMADEUS S.A.S., Biot (FR)

( * ) Notice: Subject to any disclaimer, the term of this patent is extended or adjusted under 35 U.S.C. 154(b) by 30 days.

(21) Appl. No.: 14/452,941

(22) Filed: Aug. 6, 2014

(65) Prior Publication Data

US 2016/0042353 A1    Feb. 11, 2016

(51) Int. Cl.
*G06Q 20/40* (2012.01)

(52) U.S. Cl.
CPC .................................. *G06Q 20/4016* (2013.01)

(58) Field of Classification Search
CPC .................................................. G06Q 20/4016
USPC ........................ 235/380, 379; 705/40, 44, 318
See application file for complete search history.

(56) References Cited

U.S. PATENT DOCUMENTS

| | | | | |
|---|---|---|---|---|
| 2008/0288405 A1* | 11/2008 | John | ....................... | G06Q 20/40 705/44 |
| 2012/0151515 A1* | 6/2012 | Atsmon | .................. | G06F 21/34 725/23 |
| 2013/0339186 A1* | 12/2013 | French | .................. | G06F 21/577 705/26.35 |
| 2014/0258119 A1 | 9/2014 | Canis et al. | | |
| 2015/0095247 A1* | 4/2015 | Duan | .................. | G06Q 30/0185 705/318 |
| 2015/0161609 A1* | 6/2015 | Christner | ........... | G06Q 20/4016 705/44 |

OTHER PUBLICATIONS

Canis et al., U.S. Appl. No. 13/940,417, filed Jul. 12, 2013 entitled Fraud Management System and Method.

* cited by examiner

*Primary Examiner* — Allyson Trail
(74) *Attorney, Agent, or Firm* — Thompson Hine LLP (57) ABSTRACT

Methods, systems, and computer program products for screening transactions. Transactions stored in a transaction database may provide a statistical basis for determining a probability of fraud for a pending transaction. The cost of fraud may be determined for each of a plurality of possible actions based on the probability of fraud, and the action that provides the lowest cost of fraud chosen. A cumulative cost of fraud may be determined for a set of transactions in the database. If taking the action with the lowest cost of fraud for the transaction would result in a higher cumulative cost of fraud, an action having the higher cost of fraud for the transaction may be chosen. The transaction may be added to the database, and the probability of fraud adjusted based on an amount of time since acceptance of the transaction. The statistical basis may be optimized based on a cost error.

18 Claims, 4 Drawing Sheets

PREDICTIVE FRAUD SCREENING

BACKGROUND

The invention generally relates to computers and computer systems and, in particular, to methods, systems, and computer program products that screen transactions for fraud.

In the travel industry, airline tickets are often sold through an indirect seller, such as a travel agency. The indirect seller will typically check for available flights or other travel services that satisfy a traveler's travel plans and, once matching services are found, book the services for the traveler and collect payment. Payment is often collected by charging the cost of the travel services being purchased to a credit card account provided by the traveler, with the indirect seller or validating carrier acting as a merchant.

Credit card transactions typically comprise a two-stage process of authorization and settlement. At the time of the transaction, transaction information such as the purchase amount, identity of the merchant, credit card account number and expiration date, is transmitted from the merchant to an issuing bank. The issuing bank may then check the account to verify that the credit card is valid, and that the credit limit is sufficient to allow the transaction. If the bank approves the transaction, the merchant completes the transaction and issues a ticket to the traveler. To receive payment, the merchant may send a batch of approved authorizations to an "acquiring bank" at the close of the business day. The acquiring bank may then reconcile and transmit the authorizations to the issuing banks, typically via a card network or clearing house, and deposits funds in the merchant's account. Funds are then transferred from the issuing bank to the acquiring bank, and a bill sent to the cardholder by the issuing bank.

Unfortunately, credit cards are often used to fraudulently purchase airline tickets by unscrupulous individuals who utilize improperly obtained or stolen credit cards to make unauthorized purchases. When the true cardholder notices the unauthorized purchase, they may dispute the charge with the issuing bank. This typically results in a "chargeback" being issued to the merchant for the cost of the transaction. Chargebacks can be received up to several months after the transaction occurred, by which time the travel services have normally been used. Fraudulent credit card transactions thus cause substantial harm to merchants, who generally cannot recover the costs of the travel services.

Thus, improved systems, methods, and computer program products for analyzing transactions to detect fraud are needed to reduce the incidence of fraudulent charges and reduce losses incurred by merchants and travel service providers due to fraudulent purchases of travel services.

SUMMARY

In an embodiment of the invention, a method of screening transactions is provided. The method includes receiving first data characterizing a first transaction, and determining a first probability that the first transaction is fraudulent based on the first data. The method further includes receiving second data characterizing a second transaction occurring in a period of time during which a chargeback for the first transaction can be received, and determining a second probability that the first transaction is fraudulent based on the first probability and an amount of time since acceptance of the first transaction. The method may then determine a third probability that the second transaction is fraudulent based at least in part on the second data and the second probability.

In another embodiment of the invention, an apparatus for screening transactions is provided. The apparatus includes a processor and a memory coupled to the processor. The memory includes instructions that, when executed by the processor, cause the apparatus to receive the first data characterizing the first transaction and determine the first probability that the first transaction is fraudulent based on the first data. The apparatus may further receive the second data characterizing the second transaction occurring in the period of time during which the chargeback for the first transaction can be received, and determine the second probability that the first transaction is fraudulent based on the first probability and the amount of time since acceptance of the first transaction. The apparatus may further determine the third probability that the second transaction is fraudulent based at least in part on the second data and the second probability.

In another embodiment of the invention, a computer program product is provided that includes a non-transitory computer-readable storage medium including instructions. The instructions may be configured, when executed by the processor, to cause the processor to receive the first data characterizing the first transaction and determine the first probability that the first transaction is fraudulent based on the first data. The instructions may further cause the processor to receive the second data characterizing the second transaction occurring in the period of time during which the chargeback for the first transaction can be received, and determine the second probability that the first transaction is fraudulent based on the first probability and the amount of time since acceptance of the first transaction. The processor may further determine the third probability that the second transaction is fraudulent based at least in part on the second data and the second probability.

In another embodiment of the invention, a method of screening transactions is provided that includes receiving data defining a first transaction. The method may further include determining a first cost of fraud for taking a first action and a second cost of fraud for taking a second action. In response to the second cost of fraud exceeding the first cost of fraud, the method may determine a reduction in a cumulative cost of fraud for a testing set of transactions that may be caused by taking the second action. The method may further determine a first difference between the first cost of fraud and the second cost of fraud and, if the reduction is greater than the first difference, take the second action.

In another embodiment of the invention, an apparatus for screening transactions is provided. The apparatus includes a processor and a memory coupled to the processor. The memory includes instructions that, when executed by the processor, causes the apparatus to receive data defining the first transaction. The instructions may be further configured to cause the apparatus to determine the first cost of fraud for taking the first action and the second cost of fraud for taking the second action. In response to the second cost of fraud exceeding the first cost of fraud, the apparatus may determine the reduction in the cumulative cost of fraud for the testing set of transactions by taking the second action, and determine the first difference between the first cost of fraud and the second cost of fraud. If the reduction is greater than the first difference, the apparatus may take the second action.

In another embodiment of the invention, a computer program product is provided that includes a non-transitory computer-readable storage medium including instructions. The instructions may be configured, when executed by the processor, to cause the processor to receive data defining the first transaction. The instructions may be further configured to determine the first cost of fraud for taking the first action and the second cost of fraud for taking the second action. In response to the second cost of fraud exceeding the first cost of fraud, the instructions may determine the reduction in the cumulative cost of fraud for the testing set of transactions by taking the second action, and determine the first difference between the first cost of fraud and the second cost of fraud. If the reduction is greater than the first difference, the instructions may take the second action.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention are directed to methods and systems that determine whether to accept or deny a transaction, such as a transaction to purchase a travel service, by determining a cost of fraud for the transaction. Embodiments of the invention may be implemented by a transaction screening system comprising one or more networked computers or servers. The networked computers may include a Global Distribution System (GDS), and may provide processing and database functions for travel-related systems and modules that analyze transactions for fraud.

The transaction screening system may include a transaction database comprising a set of historical transactions that provide a statistical basis for estimating a probability of fraud for future transactions. To initialize the transaction database, an initial probability of fraud may be set for each of the transactions in the set of historical transactions. At suitable intervals, or as new information is received, the probability of fraud may be updated. New information may include reception of a chargeback or expiration of an allowable chargeback period without receiving a chargeback for a transaction in the transaction database. The probability of fraud estimates may thereby be kept current with the most recent information available.

As requests for new transactions are received, the probability of fraud may be estimated for the new transactions based on the data in the transaction database. The probability of fraud may be parameterized based on a learning algorithm that uses an error function to capture an additional cost of fraud incurred by a wrong prediction. The cost of fraud may thereby be linked to making a best decision based on both incorrect predictions and correct predictions. Because the outcomes of accepted transactions are eventually known, fraud predictions for accepted transactions may be assigned a probability of fraud of zero (chargeback not received) or unity (chargeback received) once the outcome is known.

Embodiments of the invention may further include a feature that enables the system to learn by accepting transactions that would be denied based solely on the cost of fraud for that transaction. To this end, an expected change in the cost of fraud from information gained by allowing a transaction that would otherwise have been denied may be determined across a plurality of transactions. If the expected improvement in the ability to estimate the cost of fraud for other transactions offsets the cost of fraud for allowing the transaction, the transaction may be allowed. Embodiments of the invention may also include features that extend online fraud screening by taking into account not only information relevant to the transaction for which the acceptance decision needs to be made, but also probabilistic information on previous transactions.

Figure 1:
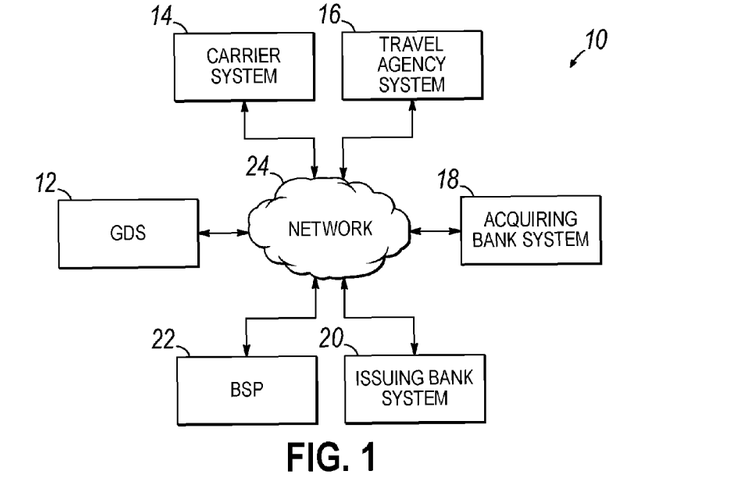
FIG. 1 is a diagrammatic view of an exemplary operating environment including a plurality of computing systems in communication via a network.

Referring now to FIG. 1, an operating environment 10 in accordance with an embodiment of the invention may include a Global Distribution System (GDS) 12, one or more travel service provider systems, such as carrier system 14, one or more indirect seller systems, such as travel agency system 16, an acquiring bank system 18, an issuing bank system 20, and a Billing and Settlement Plan (BSP) system 22. Each of the GDS 12, carrier system 14, travel agency system 16, acquiring bank system 18, issuing bank system 20, and BSP system 22 may communicate through a network 24. The carrier system 14 may include a Computer Reservation System (CRS) or billing system that enables the GDS 12 or travel agency system 16 to reserve and pay for airline tickets. The carrier system 14 may also interact with other carrier systems (not shown), either directly or through the GDS 12, to enable a validating carrier to sell tickets for seats provided by the operating carrier. The operating carrier may then bill the validating carrier for the services provided. Billing between indirect sellers and travel service providers may be provided by the BSP system 22. Revenue may also be recovered directly from the indirect sellers (i.e., without use of the BSP), in which case the travel product provider (e.g., validating carrier) may ensure that any issued memos are paid. The network 24 may include one or more private or public networks (e.g., the Internet) that enable the exchange of data.

The GDS 12 may be configured to facilitate communication between the carrier system 14 and travel agency system 16 by enabling travel agents, validating carriers, or other indirect sellers to book reservations on the carrier system 14 via the GDS 12. The GDS 12 may maintain links to a plurality of carrier systems via the network 24 that enable the GDS 12 to route reservation requests from the validating carrier or travel agency to a corresponding operating carrier. The carrier system 14 and travel agency system 16 may thereby book flights on multiple airlines via a single connection to the GDS 12.

The travel agency system 16, acquiring bank system 18, and issuing bank system 20 may be configured to exchange data necessary to execute the transaction. To this end, at the time of the transaction, the travel agency system 16 may transmit an authorization request to the issuing bank system 20. In response to receiving the authorization request, the issuing bank system 20 may verify the credit card account is valid, and that the account has a sufficient remaining credit to cover the amount of the transaction. The issuing bank system 20 may then transmit an authorization response to the travel agency system 16. This response may indicate that the transaction has been approved, declined, or may request additional information. Once the transaction is complete, the travel agency system 16 may transmit data characterizing the transaction to the acquiring bank system 18. This data may be transmitted as part of a batch file at the end of a period of time, such as at the end of a business day. The acquiring bank system 18 may then deposit funds into an account of the travel agency, and recover funds from the corresponding issuing banks of the credit cards used to purchase the travel services.

The BSP system 22 may be configured to receive data from the ticketing office of the travel agency or validating carrier reporting the sale of the ticket in the name of the operating carrier. In the United States, the Airline Reporting Corporation (ARC) normally provides this service. In any case, the BSP may act as a Business Process Outsourcer (BPO) that provides a clearing house which settles accounts between travel agencies and validating carriers. Other systems (not shown) may also be connected to the network 24 for settling accounts between operating and validating carriers, such as systems operated by the IATA Clearing House (ICH) or Airlines Clearing House (ACH). In any case, these various clearing house systems may facilitate collection of fares by the operating carrier for providing services sold by another business entity.

Figure 2:
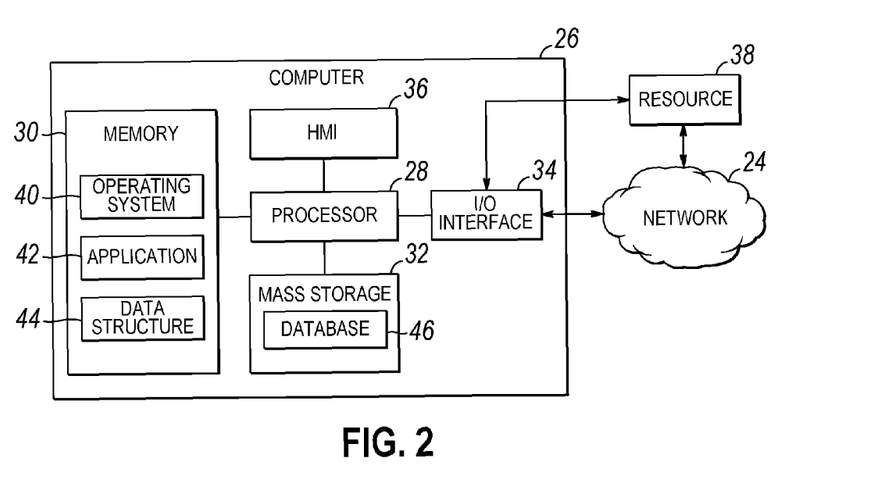
FIG. 2 is a diagrammatic view of an exemplary computing system of FIG. 1.

Referring now to FIG. 2, the GDS 12, carrier system 14, travel agency system 16, acquiring bank system 18, issuing bank system 20, and BSP system 22 of operating environment 10 may be implemented on one or more computer devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or I/O interface 34. External resources may include, but are not limited to, servers, databases, mass storage devices, peripheral devices, cloud-based network services, or any other suitable computer resource that may used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. Memory 30 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

Processor 28 may operate under the control of an operating system 40 that resides in memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or external resource 38. The application 42 may thereby work cooperatively with the network 24 or external resource 38 by communicating via the I/O interface 34 to provide the various features, functions, applications, processes, or modules comprising embodiments of the invention. The application 42 may also have program code that is executed by one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of computer 26 in a known manner to allow a user to interact directly with the computer 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, pushbuttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules. In an embodiment of the invention, the database 46 may comprise a transaction database 56 (FIG. 3) comprising historical transaction data that provides a statistical basis for estimating a probability of fraud for pending transactions.

Figure 3:
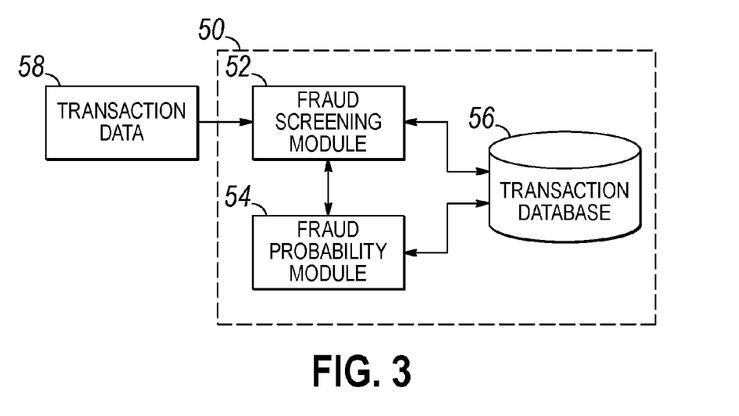
FIG. 3 is a schematic view of a transaction screening system including a fraud screening module, a fraud probability module, and a transaction database.

Referring now to FIG. 3, a transaction screening system 50 may include a fraud screening module 52, a fraud probability module 54, and the transaction database 56. The transaction screening system 50 may be provided by one or more of the GDS 12, carrier system 14, travel agency system 16, acquiring bank system 18, issuing bank system 20, BSP system 22, or any other suitable computer system. In operation, the fraud screening module 52 may receive transaction data 58 that characterizes a pending transaction. This transaction data may comprise a transaction approval request, and may include a plurality of parameters that characterize the transaction. These parameters may include, but are not limited to, an identity of a purchaser, a price being charged for the travel service, a method of payment, an account being debited for the payment (e.g., a credit card number and issuing bank), a name or company associated with the account, a reservation code, a passenger name to be listed on a ticket, an origin for a flight, a destination for the flight, a time before departure of the flight, a travel date and time, one or more stopover locations, a class of service, a type of ticket being issued (e.g., paper or electronic ticket), a type of travel product being sold, a number of travelers for which tickets are to be issued, an identity of the carrier providing the service, an identity of the seller or merchant, or any other suitable data characterizing the transaction, a location of the transaction, or an IP address of a requesting device, or any other suitable data characterizing the transaction.

The fraud screening module 52 may analyze the transaction data 58 using an estimated probability of fraud $P_E$ (e.g., an estimated probability of receiving a chargeback) and statistical data. The estimated probability of fraud $P_E$ may be determined by the fraud probability module 54, which may generate the estimated probability of fraud $P_E$ based on a fraud probability function. The parameters of the fraud probability function may comprise a set of parameters determined based on data in the transaction database 56. The transaction data 58 may also be used to adjust parameters in the fraud screening module 52 and fraud probability module 54 based on prediction errors, and to update the transaction database 56.

Figure 4:
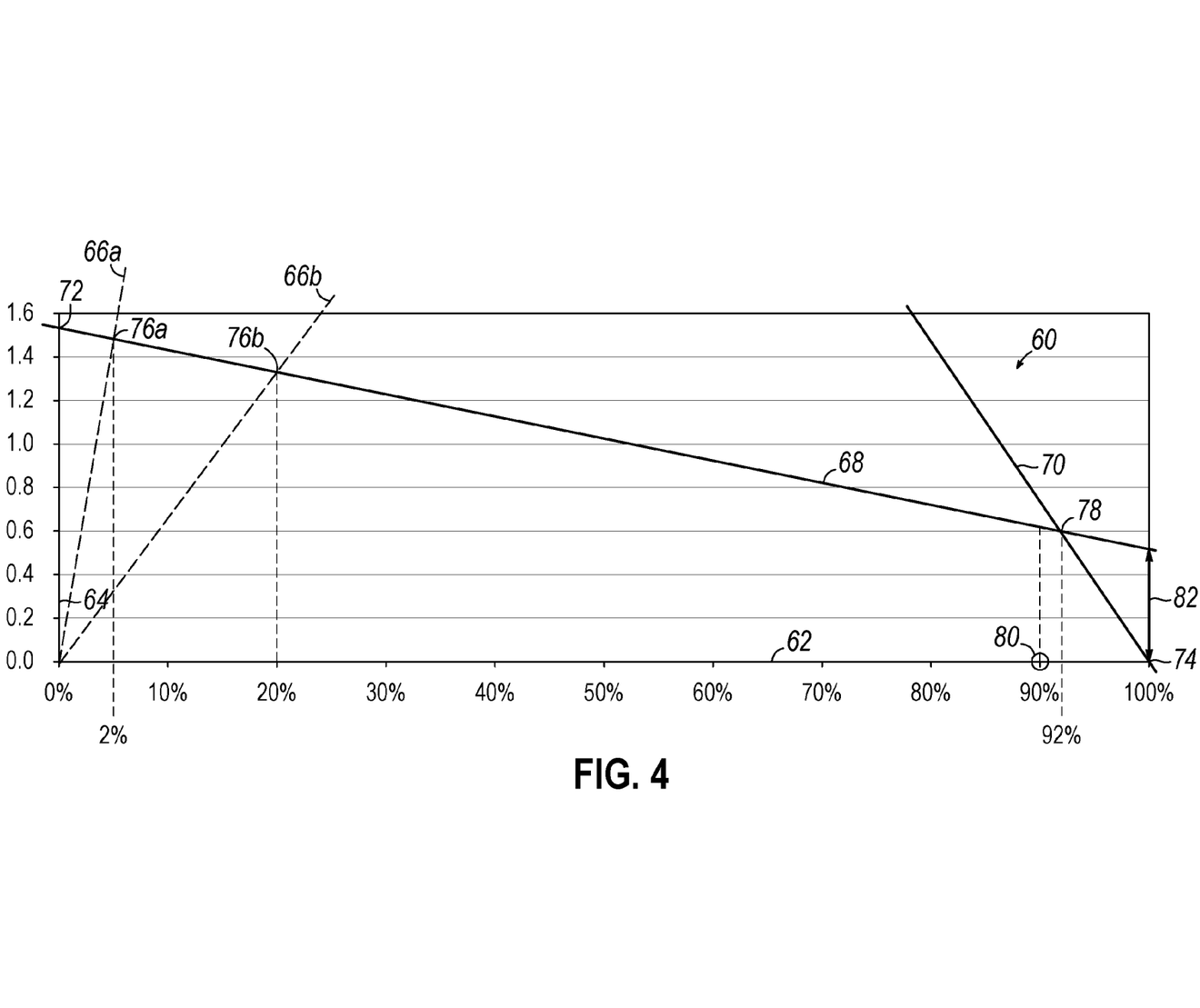
FIG. 4 is a graphical view depicting a relationship between a cost of fraud and a probability of fraud for a transaction being screened by the transaction screening system of FIG. 3.

Referring now to FIG. 4, a graph 60 includes a horizontal axis 62 corresponding to the probability P that the transaction is fraudulent, and a vertical axis 64 corresponding to an expected cost of fraud for accepting the transaction. Persons having ordinary skill in the art will understand that the scale of horizontal axis 62 and vertical axis 64 of graph 60 may be distorted in order to more clearly describe embodiments of the invention. The graph 60 includes four functions or curves 66a, 66b, 68, 70. The functions represented by curves 66a, 66b, 68, 70 may output the cost of fraud with respect to the probability of fraud P for different actions taken in response to receiving a transaction, and for different assumptions regarding the nature of the transaction. In accordance with an embodiment of the invention, an exemplary function for minimizing the cost of fraud for a transaction based on the probability of fraud P may be defined using portions of the curves 66a, 66b, 68, 70 as described below.

In an exemplary embodiment, the cost of fraud $C_F$, for accepting all transactions may be represented by curve 66a. To this end, curve 66a may comprise a line corresponding to the merchant's liability L times the probability of fraud P, so that $C_F=L\times P$. That is, curve 66a may be defined by a line intersecting the vertical axis at zero and having a slope=L, and may represent the cost of fraud versus probability of fraud P for accepting all transactions without performing any additional actions. In some cases, the merchant's liability L may be equal to an amount A of the transaction. The merchant's liability L for a given transaction may also include expected costs of processing a chargeback, generation and management of an Agency Debit Memo (ADM), and any other additional costs that may result from accepting a fraudulent transaction. Thus, curve 66a may reflect expected costs of fraud in addition to the amount A of the transaction.

The cost of fraud for transactions in which a security check is performed prior to accepting or denying the transaction may be represented by curve 68. The security check may include, for example, requesting additional identification from the traveler, such as a code transmitted to an e-mail, wireless phone, or other account associated with the cardholder. The transaction may be accepted if the security check is passed, and may be denied if the security check is not passed. The security check may also include performing a manual review of the transaction, or execution of an additional security layer. In any case, performing the security check may add additional costs to the transaction. Exemplary costs may include fixed costs, such as costs required for implementation (e.g., purchases of computer systems, data connections, terminals, etc.), and incremental costs, such as a cost per transaction (e.g., charges by firms providing the security check), and costs associated with the loss of legitimate sales due to the traveler failing to complete the transaction in response to the security check.

These costs may be reflected in the curve 68, which intersects the vertical axis 64 at reference marker 72. Because the expected cost of a chargeback, or expected chargeback amount, for a transaction having a probability of fraud P=0% is $0.00 (i.e., the probability of fraud P times the chargeback amount), the cost of fraud at reference marker 72 may be due to the amortized costs of performing the security check (e.g., $1.50 per transaction). As the probability of fraud P of receiving the chargeback increases, the cost of fraud for each transaction including the security check may decrease due to the security check identifying fraudulent charges, as indicated by the downward slope of curve 68. That is, denying fraudulent transactions identified by the security check may reduce the number of chargebacks, thereby offsetting the costs of the security check. Thus, curve 68 may slope downward as the probability of fraud P increases and a higher percentage of transactions are denied.

In some cases, the security check may have a probability of returning a false negative. That is, the security check may occasionally provide a false indication that a transaction is legitimate when the transaction is actually fraudulent. The costs associated with false negative results may tend to increase the expected cost of fraud for accepting transactions as the probability of fraud P increases. Thus, in some embodiments, the slope of curve 68 may be flat or even positive due to the number of fraudulent transactions making it through the security check. Thus, a person having ordinary skill in the art would understand that embodiments of the invention are not limited to the exemplary curve 68 shown in FIG. 4.

The cost of fraud of denying all transactions may be represented by curve 70, and may represent the cost associated with lost sales due to denying non-fraudulent transactions. Because revenue is not lost by denying a fraudulent transaction, curve 70 may provide a cost of fraud of zero for transactions having a probability of fraud P=100%. Curve 70 may therefore comprise a line that intersects the horizontal axis 62 at reference marker 74, and may be defined by $C_F=A\times(1-P)$, so that the cost of fraud $C_F=A$ for denying a transaction having probability of fraud P=0%.

To minimize the cost of fraud, embodiments of the invention may determine whether to accept the transaction, request the security check and accept or deny the transaction based thereon, or deny the transaction based on the probability of fraud P. As shown in the exemplary embodiment illustrated by FIG. 4, curve 66a intersects curve 68 at reference marker 76a (e.g., at a probability of fraud P=2%), and curve 68 intersects curve 70 at reference marker 78 (e.g., at a probability of fraud P=92%). Thus, in this illustrated embodiment, for a probability of fraud P of between 0% and 2%, the lowest cost of fraud is provided by curve 66a. To minimize the cost of fraud for this exemplary embodiment: (1) transactions having a probability of fraud P between 0 and 2% should be accepted without requesting the security check; (2) transactions having a probability of fraud P between 2% and 92% should have the security check requested and the transaction accepted or denied based on the result thereof; and (3) transactions having a probability of fraud P above 92% should be denied without running the security check. Persons having ordinary skill in the art will understand that both the number and configuration of the curves 66a, 66b, 68, 70 depicted is for exemplary purposes only. Embodiments of the invention are therefore not limited to exemplary curves 66a, 66b, 68, 70, reference markers 72, 74, 76a, 76b, 78, or the ranges and values depicted in FIG. 4.

Credit card transactions may include "card present" and "card not present" transactions. Card not present transactions occur when the purchaser is not physically present, e.g., when the transaction is conducted over the telephone or through an on-line travel agency web-site. Because the purchaser is not present with the card during card not present transactions, it may be more difficult for the indirect seller to verify that the purchaser is the actual cardholder. In some cases, billing agreements between indirect sellers and carriers may result in the liability for fraudulent charges shifting to the indirect seller if the underlying transaction was a card not present transaction.

Thus, for tickets sold in the indirect market where the carrier is the merchant, the liability for fraudulent sales may ultimately be the responsibility of the indirect seller. Under this scenario, in response to receiving the chargeback, the merchant carrier may send an ADM to the indirect seller requesting the indirect seller pay the amount of the fare plus an ADM processing fee. Unless the indirect seller can show that the sale was a "card present" sale, the indirect seller may be liable to the carrier for the charges in the ADM. In cases where the transaction in question was conducted though the on-line travel agency web-site, the transaction will typically be a card not present transaction and the indirect seller will be unable to prove the sale. Thus, carriers may wish to take into account this difference in liability between indirect sales and direct sales when determining whether to accept, deny, or request more information on a transaction.

To this end, carriers may determine a percentage of total transactions that are on-line transactions for each indirect seller. The carrier may then adjust the merchant's liability L for fraud for each indirect seller based on the percentage of their total transactions that are on-line transactions. In the exemplary graph 60, the travel agency in question may conduct 90% of their transactions through an on-line web-site, and 10% of their transactions in person at an office. In this example, the carrier may wish to adjust the merchant's liability L for each transaction made by this travel agency downward by 90%. This adjustment may be based on an expectation that losses will be recovered for a large percentage of fraudulent transactions conducted on-line by this travel agency. The downward adjustment in the merchant's liability L may result in a corresponding reduction in the slope of the line corresponding to the cost of fraud $C_F$, as indicated by curve 66b. Curve 66b may, in turn, result in the intersection with curve 68 shifting from reference marker 76a to reference marker 76b.

Thus, if the carrier takes into account the amount of on-line transactions conducted by the travel agency when minimizing the cost of fraud: (1) transactions having a probability of fraud P between 0 and 20% should be accepted without requesting the security check; (2) transactions having a probability of fraud P between 20% and 92% should have the security check requested and the transaction accepted or denied based on the result thereof; and (3) transactions having a probability of fraud P above 92% should be denied without running the security check. For the purpose of clarity, the slope of curve 68 was not adjusted in the above example to account for the reduction in the merchant's liability L. However, a person having ordinary skill in the art would understand that changes in the merchant's liability L could also affect the positions of the points defining curve 68, further contributing to shifts in reference points 76b and 78.

The selection process described above may rely on an assumption that the probability of fraud P is accurate. However, the probability of fraud P for determining which action to take may be the estimated probability of fraud $P_E$ provided by the fraud probability module 54, and may differ from an actual probability of fraud $P_A$ that a chargeback will be received for the transaction. To reduce this prediction error and adapt the system to changing conditions, embodiments of the invention may determine an additional cost to the merchant, or "cost error" $C_E$, incurred by predicting a "wrong" probability of fraud P, and adjust the parameters in the fraud screening module 52, fraud probability module 54, or transaction database 56 to minimize the cost error $C_E$.

The transaction screening system 50 may determine the cost error $C_E$ using historical data in the transaction database 56 by comparing estimated probabilities $P_E$ for accepted transactions to a known probability based on whether a chargeback was received for the transaction in question. By way of example, the actual probability of fraud $P_A$ for an accepted transaction being analyzed may be represented by reference marker 74, which is at 100% on the horizontal axis. The actual probability of fraud $P_A$ may be set to 100% because a chargeback was received on the transaction in question. The estimated probability of fraud $P_E$ that was generated by the fraud engine for the transaction in question may be represented by reference marker 80, which is located at about 90% on the horizontal axis 62. Thus, the prediction error for this transaction may be about 10%.

Based on the actual probability of fraud $P_A$, the optimal decision for minimizing $E_{COF}$ would have been provided by curve 70, so that had the probability of fraud $P_E$ been correct, the transaction would have been rejected without requesting a security check. In contrast, based on the estimated probability of fraud $P_E$ generated by the fraud probability module 54, the decision was provided by curve 68, which caused the fraud screening module to request the security check. In this example, cost error $C_E$ caused by the inaccuracies in the estimated probability of fraud $P_E$ may be the difference 82 between the cost of fraud $C_F$ provided by curve 68 and the cost of fraud $C_F$ provided by curve 70 for the actual probability of fraud $P_A$ represented by reference marker 74, e.g., about $0.50. That is, in this specific example, the expected cost of choosing to perform the security check rather than simply denying the transaction would add about $0.50 to the cost of fraud $C_F$ for the transaction in question. In an embodiment of the invention, the cost error $C_E$ for a plurality of historical transactions may provide a cost error function that is to be minimized. That is, the transaction screening system 50 may adjust the parameters of the fraud screening module 52, fraud probability module 54, or transaction database 56 to minimize the cost error $C_E$ for a set of historical transactions.

To parameterize the algorithm, historical data stored in the transaction database 56 may be used to minimize a sum of error functions. Methods that may be used to ensure the right fit and convergence of error minimization functions may include randomly initializing a set of parameters θ, and converging towards optimum values for the set of parameters θ using a stochastic gradient descent. This may include the use of a regularization parameter λ. To this end, the historical data may be separated into a training set TR (e.g., 60% of the historical data); a cross-validation set CV (e.g., 20% of the historical data), and a testing set TE (e.g., 20% of the historical data). The regularization parameter λ may be used to avoid over or under-fitting while minimizing the following function:

$$J(\theta)=erf(\theta)+\lambda\|\theta\|^2$$

Determining the error may comprise: (1) using the training set TE to determine the values of the set of parameters θ as a function of λ; (2) using the cross-validation set CV to discriminate between different values of λ and to select λ such that J(TR)~J(CV) is minimized; and (3) choosing the set of parameters θ that corresponds to the determined λ. A "representative" loss may then be determined by J(TE).

Figure 5:
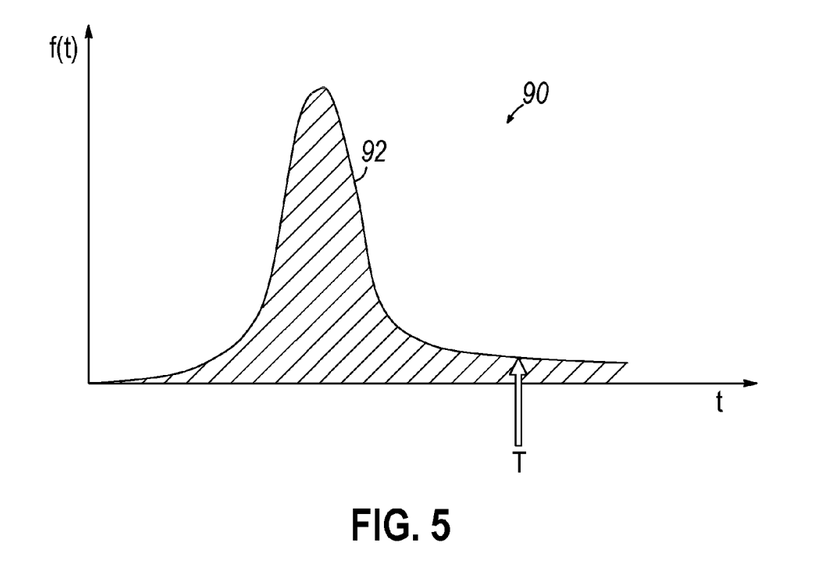
FIG. 5 is a graphical view of a probability density function depicting a relationship between a probability of receiving a chargeback on the transaction, and an amount of time since acceptance of the transaction.

Referring now to FIG. 5, a graph 90 depicts a plot 92 that may represent an exemplary probability density f(t) with respect to time for receiving a chargeback on a transaction, or a chargeback amount density function. The probability density f(t) may be determined empirically based on historical transaction data in the transaction database 56. To this end, the probability density f(t) may be based on a reference distribution determined from the amounts of time between a date of acceptance and a date of reception of a chargeback for each transaction in a set of transactions in the transaction database 56.

The probability of fraud P(t) that a chargeback will be received by time T from the date of acceptance of a transaction may then be determined based on the area under the plot 92, as given by:

$$P \times F(T) = P \times \int_0^T f(t)dt$$

The probability of fraud P may be determined based on a set of transactions in the transaction database that are past the chargeback period. That is, for transactions beyond the chargeback period, it may be known whether the transaction was subject to a chargeback, and thus fraudulent. The probability of fraud P for the set of accepted transactions past the chargeback period may therefore be determined based on the ratio between the total number of transactions in the set, and the number subject to a chargeback in the set. The total area under the plot 92 may be unity, as shown by:

$$F(x) = \int_0^{T_{max}} f(t)dt = 1$$

where $T_{max}$ is the time limit for receiving a chargeback, or the chargeback period, of the transaction. That is, once $t > T_{max}$, a chargeback can no longer be received, so that the probability density f(t)=0 beyond $T_{max}$.

For transactions that have not received a chargeback, but that are still within their chargeback period, the probability P(t) with respect to t may be determined based on the amount of time that has passed since acceptance of the transaction as follows:

$$P(t) = P \times \frac{1 - F(t)}{1 - P \times F(t)}$$

As can be seen from the equation for P(t) and exemplary plot 92, the probability of fraud P(t) for a given transaction may drop as time passes without receiving a chargeback. An expected chargeback amount may be determined for the transaction by multiplying the cost of the chargeback (e.g., the cost of the transaction) times the probability of fraud P(t).

To initialize the transaction database 56, an initial probability of fraud $P_I$ may be set for all transactions. This value may be a predetermined value, or may be based on transactions where a previous fraud screening strategy has been applied, such as a previous accounting period. The initial probability of fraud $P_I$ may be estimated based on the acceptance decisions applied to the historical transactions. On average, the observed, or statistical fraud rate for accepted transactions can be measured as being a certain percentage, referred to herein as X %. Because the number of chargebacks that would have been received for denied transactions if they had been accepted is not known, it may be necessary to estimate the fraud rate for these transactions and simply set the rate to the estimated percentage. This estimate may be based on statistics for similar transactions that were accepted, or simply selected based on experience. For subsequent iterations, the initial probability of fraud may be provided by the fraud probability module 54. If the decision whether to accept or deny the transaction was based on the outcome of the security check, the probability of fraud estimation may take this into account.

Figure 6:
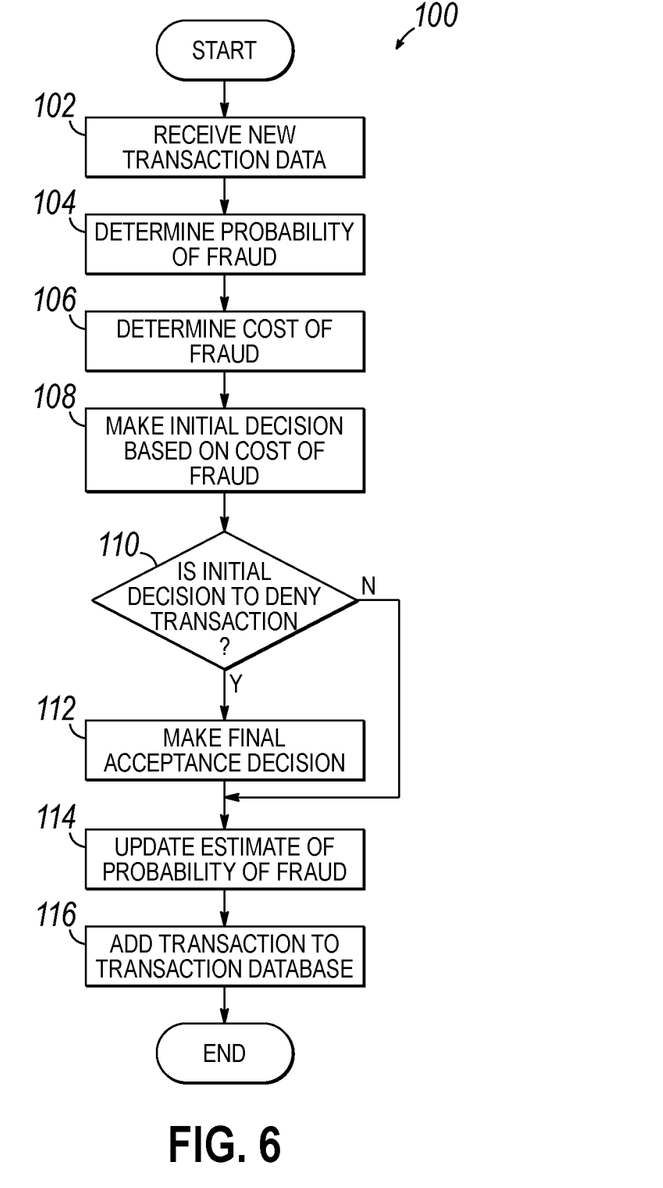
FIG. 6 is a flowchart of a transaction screening process that may be performed by the transaction screening system of FIG. 3.

Referring now to FIG. 6, a flowchart depicts a process 100 that may be executed by the transaction screening system 50 to screen transactions. In block 102, the process 100 may receive the transaction data 58 for a new transaction. In response to receiving the transaction data 58, the process 100 may proceed to block 104 and estimate the probability of fraud $P_E$ for the transaction. If the process 100 has yet to process any transactions in the current analysis period, the estimated probability of fraud $P_E$ may be set to the initial probability of fraud $P_I$, as described above with respect to FIG. 5. The initial probability of fraud $P_I$ may also be determined based on an initial or predetermined model that determines the probability of fraud based on the transaction data 58. For example, the initial probability of fraud $P_I$ may be based on a combination of an average observed fraud rate for transactions accepted during a previous accounting period, or an estimated fraud rate for transactions that were rejected during the previous accounting period. That is, at the earliest iteration of the process 100, the data in the transaction database 56 may be based on transactions where a previous fraud screening strategy was applied. In any case, in response to determining the estimate probability of fraud $P_E$, the process 100 may proceed to block 106.

In block 106, the process 100 may determine the cost of fraud $C_F$ for the transaction based on the estimated probability of fraud $P_E$. As described above with respect to FIG. 4, this determination may include generating the cost of fraud $C_F$ for each of a plurality of possible actions. The process 100 may then proceed to block 108 and make an initial decision on which action to take by selecting the action that produces the lowest cost of fraud $C_F$. In an embodiment of the invention, the available actions may include: (1) accepting the transaction; (2) requesting the security check and accepting or denying the transaction in response to the result; or (3) denying the transaction without requesting the security check. For example, if the cost of fraud for accepting the transaction is less than the cost of fraud for requesting the security check or denying the transaction, the initial decision may be to accept the transaction. In response to the initial decision being determined, the process 100 may proceed to block 110.

In block 110, the process 100 may determine if the initial decision is to deny the transaction. In response to the initial decision not being to deny the transaction ("NO" branch of decision block 110), the process 100 may proceed to block 114. In response to the initial decision being to deny the transaction, the process 100 may proceed to block 112. In block 112, the process 100 may determine an expected impact on a cumulative cost of fraud for a plurality of transactions by accepting the transaction. If the impact on the cumulative cost of fraud outweighs the cost of fraud for the denied transaction, the transaction screening system 50 may accept the current transaction despite the fact that accepting the current transaction has a higher cost of fraud than denying the transaction. Because data regarding chargebacks is not collected on transactions unless they are accepted, in some cases it may be advantageous to accept a transaction that would normally be denied based on the cost of fraud for that transaction. By accepting a portion of these transactions, the transaction screening system 50 may obtain chargeback data on transactions that would normally be denied. This information may then be used to update the fraud screening parameters.

By way of example, assume that for a particular transaction, the cost of fraud $C_F$ for accepting the transaction is greater than the cost of fraud $C_F$ of rejecting the transaction, or $$(1-P_E) \times C_{LS} < P_E(C_P + C_{FL})$$

where $C_{LS}$ is a cost of lost sales resulting from a falsely rejected transaction, $C_P$ is a cost of processing a chargeback, and $C_{FL}$ is the cost of fraud liability (e.g., the cost of the travel service).

If the transaction is accepted to gain information, the cost of accepting this transaction $C_A$ to obtain this information may be given by the difference between the cost of fraud $C_F$ of accepting the transaction and the cost of fraud $C_F$ of rejecting the transaction, as shown by:

$$C_A = C_F(\text{Accept}) - C_F(\text{Reject})$$

If the expected cumulative cost of fraud $C_F$ saved in future transactions by obtaining information on the current transaction is greater than the cost of accepting $C_A$, it may be advantageous to accept the transaction.

A decision to allow the transaction in question may produce three scenarios with regard to the make-up of the transaction training set: (1) the current training set without the additional transaction ($TR_0$); (2) the current training set plus the additional transaction assuming that the additional transaction is fraudulent ($TR_1$); and (3) the current training set plus the additional transaction assuming that the additional transaction is not fraudulent ($TR_2$). Determining a "gain" G in the cumulative cost of fraud due to the improvement in accuracy by accepting the transaction may include: (1) determining parameters for the fraud probability module 54 for each training set $TR_0$, $TR_1$, $TR_2$; (2) computing the cumulative cost of fraud $C_F(TE, TR)$ for each set of parameters over the testing set TE; and (3) subtracting a weighted sum of the cumulative costs of fraud for the training sets including the additional transaction from the cumulative cost of fraud of the training set without the additional transaction. The gain G may be shown in equation form as:

$$G = C_F(TE, TR_0) - [P_E \times C_F(TE, TR_1) + (1-P_E) \times C_F(TE, TR_2)]$$

Thus, a positive gain G may indicate an expected reduction in the cumulative cost of fraud $C_F(TE, TR)$ across the testing set TE that would result from adding the current transaction to the training set TR. If the gain G is greater than the cost of accepting the transaction $C_A$ for the transaction in question, the process 100 may accept the transaction before proceeding to block 114. If the gain G is not greater than the cost of accepting the transaction $C_A$ for the transaction in question, the process 100 may deny the transaction before proceeding to block 114.

In block 114, the process 100 may update the estimated probability of fraud $P_E$ for transactions in the transaction database 56 based on additional information received since a previous update, such as information regarding chargebacks. This updating may occur at regular intervals, such as once a day. Because new information on chargebacks may not be received for transactions that were denied, the updated probability of fraud $P_E$ for denied transactions may remain unchanged from the initial probability of fraud $P_I$.

Each accepted transaction may have one of three statuses: (1) a chargeback has been received, in which case the probability of fraud P may be set to 100% for that transaction; (2) a chargeback has not been received, in which case the estimated probability of fraud $P_E$ for that transaction may decrease for each additional day that passes without receiving a chargeback; and (3) the chargeback period has expired without receiving a chargeback, in which case the probability of fraud P may be set to 0% for that transaction. The decrease in the probability of fraud P for transactions that have not received a chargeback, but are still within the chargeback period, may be estimated based on data in the historical database as described above with respect to FIG. 5 and as given by:

$$P_{n+1} = P_n \times \frac{1-F(t)}{1-P_n \times F(t)}$$

In certain tax jurisdictions, merchant fees may depend on a percentage of fraudulent transactions accepted by the merchant during an accounting period. That is, the merchant fees may depend on a ratio between a number or dollar amount of fraudulent transactions and the total sales during the accounting period for which the merchant fees are being assessed. To account for this variation, the transaction screening system 50 may take into account the effect of fraudulent transactions on merchant fees. To this end, the transaction screening system 50 may be configured to determine an expected merchant fee based on an estimate of sales by the merchant. This estimate may be provided by the merchant, or may be estimated based on any suitable set of parameters, such as historical sales data for the merchant, time of year, etc.

By way of example, by the end of day n of the accounting period, the transaction screening system 50 may have accepted m transactions during the accounting period. The transaction screening system 50 may determine a cumulative expected chargeback amount $CB_E$ for day n using the following equation:

$$CB_E(n) = \sum_{i=1}^{m} P_i(n) \times C$$

where $P_i(n)$ is the updated probability of fraud for transaction i on day n, and C is the cost of transaction i, or the cost of a chargeback, should one be received.

For each sub-period (e.g., day) k of the accounting period (e.g., month, quarter, year), a batch run may be executed that, for each transaction accepted, updates the probability of fraud as follows: (1) if the probability of fraud P is 1 (e.g., a chargeback has been received), keep P equal to 1; (2) if a chargeback was received on day n, set $P_i(n)=1$; (3) otherwise, for each sub-period k, $$P_i(n) = P_i(k) \times \frac{1-F(n-k)}{1-P_i(k) \times F(n-k)}$$

To account for sub-periods beyond the current sub-period, the transaction screening system 50 may perform a Monte-Carlo simulation to obtain a distribution of expected chargeback amounts across the accounting period. This simulation may be based at least in part on the estimate of sales for the accounting period. The expected merchant fee may then be determined based on the expected chargeback amount distribution and estimated sales for the period.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention is not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently in consistency with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:
1. A method of screening transactions, the method comprising:
 receiving, at a computer, first data characterizing a first transaction;
 storing, by the computer, the first transaction in a transaction database that includes a first plurality of transactions each associated with a probability of fraud;

determining, by the computer, a first probability that the first transaction is fraudulent based on the first data and the probability of fraud of one or more transactions in the transaction database;

setting, by the computer, the probability of fraud for the first transaction in the transaction database to the first probability;

receiving, at the computer, second data characterizing a second transaction occurring in a period of time during which a chargeback for the first transaction can be received;

determining, by the computer based on the transactions in the transaction database, a probability density function with respect to time for receiving the chargeback;

determining, by the computer, an area of a portion of the probability density function corresponding to an amount of time since acceptance of the first transaction;

determining, by the computer, a second probability that the first transaction is fraudulent based on the first probability and the area;

updating, by the computer, the probability of fraud for the first transaction in the transaction database to the second probability; and determining, by the computer, a third probability that the second transaction is fraudulent based at least in part on the second data and the updated probability of fraud of the first transaction in the transaction database.

2. The method of claim 1 wherein determining the probability density function comprises:
   determining a second plurality of transactions in the transaction database for which chargebacks have been received; and
   determining a reference distribution for the second plurality of transactions with respect to the amount of time between acceptance of each transaction and receipt of a corresponding chargeback,
   wherein the probability density function is determined based on the reference distribution.

3. The method of claim 1 wherein the first transaction and the second transaction comprise a second plurality of transactions each having a date of acceptance and occurring within an accounting period comprising a plurality of sub-periods, the method further comprising:
   for each transaction in the accounting period:
      determining if the chargeback has been received,
      setting the probability of fraud for the transaction to the second probability for the transaction if the chargeback has not been received,
      setting the probability of fraud for the transaction to unity if the chargeback has been received, and
      multiplying a cost of the transaction by the probability of fraud for the transaction to generate an expected chargeback amount for the transaction.

4. The method of claim 3 wherein at least a portion of the second plurality of transactions comprise transactions conducted by an indirect seller, and further comprising:
   determining a percentage of transactions in the portion that are card not present transactions; and
   adjusting the expected chargeback amount for transactions conducted by the indirect seller based on the percentage.

5. The method of claim 3 further comprising:
   in response to receiving the chargeback, determining if the underlying transaction is a card not present transaction; and
   in response to the underlying transaction being the card not present transaction, generating an agency debit memo to recover the chargeback.

6. The method of claim 3 further comprising:
   summing the expected chargeback amounts to produce a cumulative expected chargeback amount; and
   determining an expected merchant fee based on the cumulative expected chargeback amount.

7. The method of claim 6 further comprising:
   determining a cost of fraud for the second transaction based on the expected chargeback amount for the second transaction and the expected merchant fee.

8. The method of claim 6 wherein the second plurality of transactions are by a merchant, and further comprising:
   determining a chargeback amount density function for the merchant over the accounting period.

9. The method of claim 8 wherein determining the chargeback amount density function comprises:
   summing the expected chargeback amounts of the second plurality of transactions to generate the cumulative expected chargeback amount for each sub-period up to and including a current sub-period; and
   performing a Monte-Carlo simulation to obtain a distribution of expected chargeback amounts for each sub-period beyond the current sub-period,
   wherein the chargeback amount density function comprises the cumulative expected chargeback amounts.

10. An apparatus for screening transactions, the apparatus comprising:
    a processor; and
    a memory including instructions that, when executed by the processor, cause the apparatus to:
    receive first data characterizing a first transaction;
    store the first transaction in a transaction database that includes a first plurality of transactions each associated with a probability of fraud;
    determine a first probability that the first transaction is fraudulent based on the first data and the probability of fraud of one or more transactions in the transaction database;
    set the probability of fraud for the first transaction in the transaction database to the first probability;
    receive second data characterizing a second transaction occurring in a period of time during which a chargeback for the first transaction can be received;
    determine, based on the transactions in the transaction database, a probability density function with respect to time for receiving the chargeback;
    determine an area of a portion of the probability density function corresponding to an amount of time since acceptance of the first transaction;
    determine a second probability that the first transaction is fraudulent based on the first probability and the area;
    update the probability of fraud for the first transaction in the transaction database to the second probability; and
    determine a third probability that the second transaction is fraudulent based at least in part on the second data and the updated probability of fraud of the first transaction in the transaction database.

11. The apparatus of claim 10 wherein the instructions cause the apparatus to determine the probability density function by:
    determining a second plurality of transactions in the transaction database for which chargebacks have been received; and
    determining a reference distribution for the second plurality of transactions with respect to the amount of time between acceptance of each transaction and receipt of a corresponding chargeback, wherein the probability density function is determined based on the reference distribution.

12. The apparatus of claim 10 wherein the first transaction and the second transaction comprise a second plurality of transactions each having a date of acceptance and occurring within an accounting period comprising a plurality of sub-periods, and the instructions further cause the apparatus to, for each transaction in the accounting period:
   determine if the chargeback has been received;
   set the probability of fraud for the transaction to the second probability for the transaction if the chargeback has not been received;
   set the probability of fraud for the transaction to unity if the chargeback has been received; and
   multiply a cost of the transaction by the probability of fraud for the transaction to generate an expected chargeback amount for the transaction.

13. The apparatus of claim 12 wherein at least a portion of the second plurality of transactions comprise transactions conducted by an indirect seller, and the instructions further cause the apparatus to:
   determine a percentage of transactions in the portion that are card not present transactions; and
   adjust the expected chargeback amount for transactions conducted by the indirect seller based on the percentage.

14. The apparatus of claim 12 wherein the instructions further cause the apparatus to:
   in response to receiving the chargeback, determine if the underlying transaction is a card not present transaction; and
   in response to the underlying transaction being the card not present transaction, generate an agency debit memo to recover the chargeback.

15. The apparatus of claim 12 wherein the instructions further cause the apparatus to:
   sum the expected chargeback amounts to produce a cumulative expected chargeback amount; and
   determine an expected merchant fee based on the cumulative expected chargeback amount.

16. The apparatus of claim 15 wherein the instructions further cause the apparatus to:
   determine a cost of fraud for the second transaction based on the expected chargeback amount for the second transaction and the expected merchant fee.

17. The apparatus of claim 15 wherein the second plurality of transactions are by a merchant, and the instructions further cause the apparatus to:
   determine a chargeback amount density function for the merchant over the accounting period.

18. A computer program product comprising:
   a non-transitory computer-readable storage medium; and
   instructions stored on the non-transitory computer-readable storage medium that, when executed by a processor, cause the processor to:
   receive first data characterizing a first transaction;
   store the first transaction in a transaction database that includes a plurality of transactions each associated with a probability of fraud;
   determine a first probability that the first transaction is fraudulent based on the first data and the probability of fraud of one or more transactions in the transaction database;
   set the probability of fraud for the first transaction in the transaction database to the first probability;
   receive second data characterizing a second transaction occurring in a period of time during which a chargeback for the first transaction can be received;
   determine, based on the transactions in the transaction database, a probability density function with respect to time for receiving the chargeback;
   determine an area of a portion of the probability density function corresponding to an amount of time since acceptance of the first transaction;
   determine a second probability that the first transaction is fraudulent based on the first probability and the area;
   update the probability of fraud for the first transaction in the transaction database to the second probability; and
   determine a third probability that the second transaction is fraudulent based at least in part on the second data and the updated probability of fraud of the first transaction in the transaction database.

* * * * *